March 7, 1939.  J. M. NICKELSEN  2,149,622
CONNECTOR
Filed May 11, 1936   2 Sheets-Sheet 1

INVENTOR
JOHN M. NICKELSEN
BY
ATTORNEYS

March 7, 1939.  J. M. NICKELSEN  2,149,622
CONNECTOR
Filed May 11, 1936  2 Sheets-Sheet 2

INVENTOR
JOHN M. NICKELSEN
BY
ATTORNEYS

Patented Mar. 7, 1939

2,149,622

UNITED STATES PATENT OFFICE 2,149,622

CONNECTOR

John M. Nickelsen, Ann Arbor, Mich., assignor to Monroe Auto Equipment Company, Monroe, Mich., a corporation of Michigan Application May 11, 1936, Serial No. 79,193

4 Claims. (Cl. 287—85)

This invention relates generally to connectors and refers more particularly to connectors of the type having a link and having studs provided with head portions retained in assembled relation with the link by resilient inserts secured under compression within the end portions of the link at opposite sides of the stud heads.

One of the principal objects of this invention is to simplify, reduce the cost of manufacture, and otherwise improve connectors of the above type by providing a construction wherein adjacent resilient inserts substantially completely surround the head of the stud interposed therebetween, and wherein this desirable feature is accomplished without resorting to the expensive step of individually molding the inserts to conform the adjacent inner surfaces thereof to the head of the fastener element therebetween. Insofar as the present invention is concerned, a strip of resilient material of substantial length may be fashioned to the desired diameter of the inserts and the latter formed by severing the strip of material at spaced points depending upon the length of the inserts required.

Another advantageous feature of this invention resides in the provision of a connector wherein the adjacent inner edge portions of the inner inserts are provided with an axial bore controlling the flow of resilient material when compressed against the head of the stud to facilitate deformation of the inner surfaces of the inserts to the contour of the stud head. This arrangement is advantageous in that it offers the possibility of forming the inserts of molded rubber having sufficient consistency to firmly clamp the studs in assembled relation with the link and, in addition, renders it possible to conform the adjacent inner end portions of the rubber inserts to the contour of the stud heads without the necessity of exerting abnormal pressure on the inserts.

The foregoing, as well as other objects, will be made more apparent as this description proceeds, especially when considered in connection with the accompanying drawings, wherein.

Although connectors constructed in accordance with this invention may be advantageously employed in practically any installation requiring the connection of two relatively movable parts, nevertheless, the nature of the construction of the link renders the same particularly useful in vehicle installations for connecting sprung and unsprung parts of the vehicle. In the specific illustrated embodiments of the invention, the connectors are shown as operable to establish a connection between the axle of a vehicle and the free ends of shock absorber arms carried by the frame or sprung weight of the vehicle.

Figure 1:
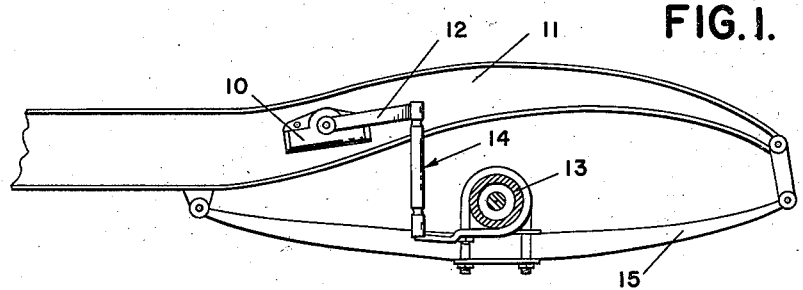
Figure 1 is a fragment or a side elevational view partly in section of a motor vehicle equipped with a connector constructed in accordance with this invention.
Figure 2:
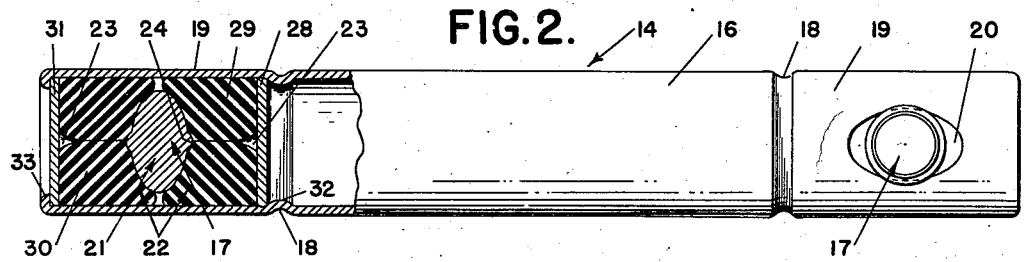
Figure 2 is a side elevational view partly in section of the connector shown in Figure 1.

Referring more in detail to the embodiment of the invention shown in Figures 1 to 4 inclusive, it will be noted that I have illustrated in Figure 1, a shock absorber 10 secured to the frame or sprung weight 11 of the vehicle and having an arm 12 connected to the unsprung weight or axle 13 through the medium of a connector 14. The frame assembly 11 is shown as suspended from the axle 13 by means of the usual semi-elliptical leaf springs 15, and the action of these springs is effectively controlled by the shock absorbers through the connectors 14.

The connector 14 comprises a link 16 and studs 17 anchored in opposite end portions of the link. In the interest of economy and durability, the link 16 is in the form of a tube having annular restricted portions 18 spaced from each other in the direction of the axis of the tube and defining housings 19 at opposite ends of the link. Upon reference to Figure 2, it will be noted that the housings 19 are formed with elliptical openings 20 through one side thereof, having the major axes extending parallel to the axis of the link and of a length slightly greater than the length of the spaded head portions 21 of the fastener elements 17 to provide for insertion of the head portions 21 into the housings through the openings 20. It will also be observed from Figure 2 that the maximum width of the openings 20 is less than the length of the head portions 21 on the studs 17 so that rotation of the studs 17 throughout 90°, after the heads 21 are inserted into the housings through the openings 20, positions the heads 21 transversely to the major axes of the openings 20, and thereby prevents disengagement of the heads from the housings.

The heads 21 of the fastener elements 17 are maintained in interlocking relationship with the housings 19 at opposite ends of the link 16 by means of resilient inserts 22 secured under compression within the housings at opposite sides of the heads 21. In the present instance, the inserts are formed of molded rubber and a pair of the inserts is provided in each housing 19 with the inserts of each pair on opposite sides of the head 21 in each housing 19. The combined length of each pair of inserts 22 is greater than the length of the associated housing plus the width of the head 21, located in the housing between the inserts, by an amount determined to provide for substantially surrounding the spaded head portions 21 by the adjacent inserts when the latter are compressed in the housings in the manner shown in Figure 3.

In order to insure substantially surrounding the spaded heads 21 of the fastener elements 17 by the adjacent rubber inserts, without the necessity of pre-forming the inner surfaces of the inserts to conform to the head portions 21, each of the inserts are formed with an axially extending bore or opening 23 therethrough. These openings cause the rubber or resilient material from which the inserts are formed to flow in the manner shown in Figure 3 when the inserts are compressed, and thereby function to facilitate deformation of the adjacent inner surfaces of the inserts to the contour of the spaded head portions 21 on the studs 17. It will, of course, be understood that the length of the spaded head portions 21 is less than the diameter of the housings so as to provide sufficient clearance between the ends of the heads 21 and adjacent walls of the housings to permit the yieldable material of the inserts to flow therebetween in the manner clearly illustrated in Figure 2. In this connection, projections 24 are formed on the opposed arcuate surfaces 25 of the spaded head portions 21 of the fastener elements 17 for the purpose of cooperating with the inner ends of the openings 23 through adjacent inserts to center the head portions 21 in the housings in the manner shown in Figure 4.

Figure 3:
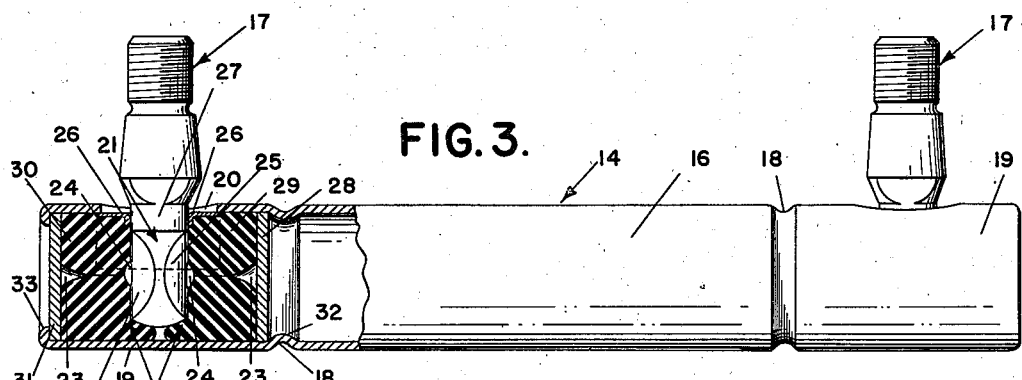
Figure 3 is a side elevational view partly in section of the connector illustrating more in detail the manner in which the studs are secured to the connector link.
Figure 4:
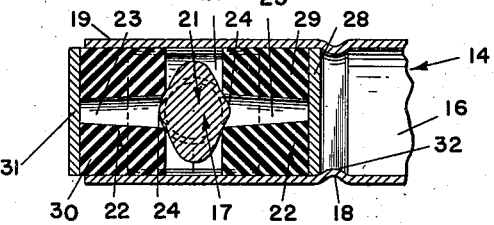
Figure 4 is a fragmentary sectional view showing the position of the parts prior to compressing the yieldable inserts.
Figure 5:
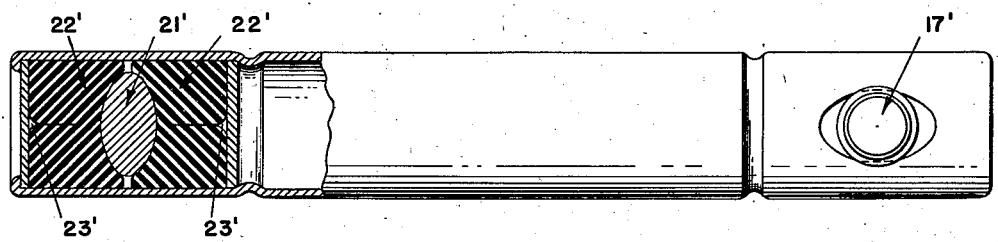
Figure 5 is a side elevational view partly in section of a modified form of connector link construction.
Figure 6:
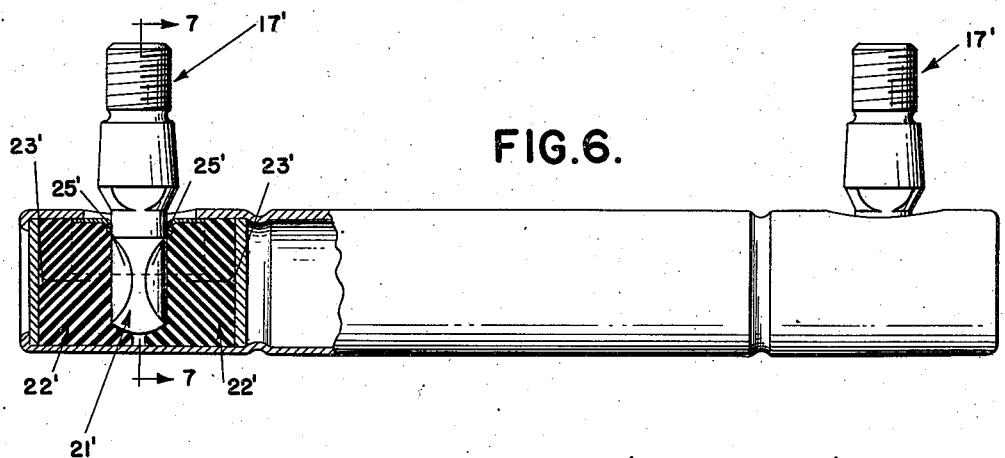
Figure 6 is a side elevational view of the construction shown in Figure 5 and having certain parts broken away for the sake of clearness.

In order to prevent displacement of the portions of the rubber inserts through the elongated openings 20 when the former are compressed, I provide suitable closures for these openings. As shown in Figure 3, the closure for each opening 20 comprises a pair of complementary semi-circular strips 26, having recesses in adjacent edges cooperating with each other to form an opening of the size required to receive the reduced portions 27 of the studs 17. The complementary sections 26 of the closures are, of course, located within the housings 19 and cooperate with the reduced portions 27 of the studs 17 to completely close the elongated openings 20. The complementary sections 26 are preferably formed of a highly ductile metal such as copper, so that the contact of the same with the studs and housings will not create objectionable noise during operation.

Referring briefly to the method of assembly of the connector previously described, it will be noted that the discs 28 and the inner inserts 29 of each pair are inserted into the housings 19 in the order named before the heads 21 on the studs 17 are inserted into the housings through the openings 20 in the manner clearly defined above. This is also true of the inner sections 26 of the closures for the openings 20, and after the latter have been properly inserted into the housings 19, the head portions 21 on the fastener element 17 are assembled within the housings. In this connection, attention is called to the fact that, although the inner ends of the inserts 29 extend into the openings 20, nevertheless the inserts are capable of sufficient compression by the heads 21, as they are inserted into the openings 20, to provide the required clearance for the passage of the head portions 21 through the openings 20.

After the head portions 21 have been assembled in the housings 19 at the inner sides of the inserts 29, the cooperating inserts 30 are inserted into the housings 19 from the outer ends of the latter. At the same time, the complementary sections 26 of the closure are inserted in the housings 19 and the heads 21 of the studs 17 are centered by locating the projections 24 in the inner ends of the openings 23 through the inserts. Upon completion of this operation, the parts take the position thereof shown in Figure 4, and pressure is applied to the outer inserts 30 through the medium of the discs 31 tending to move the latter in directions toward the discs 28 seated on the annular shoulders 32 formed by the reduced portions 18 of the link. Upon completing the compression of the inserts, the outer ends of the housings 19 are crimped over the discs 31 in the manner designated by the reference character 33 in Figure 3, to secure the parts in assembled relationship.

Figure 8:
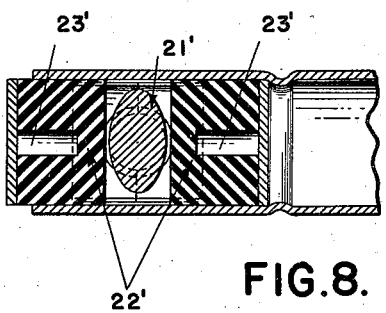
Figure 8 is a fragmentary sectional view showing the position of the parts prior to compressing the yieldable inserts.
Figure 7:
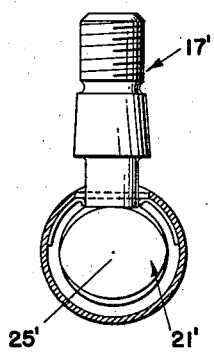
Figure 7 is a sectional view taken substantially on the plane indicated by the line 7—7 of Figure 6.

The embodiment of the invention shown in Figures 5 to 8 inclusive, differs from the one previously described in that the axially extending openings 23' do not extend completely through the inserts 22' as in the first embodiment of the invention, but on the other hand, terminate short of the inner surfaces of the inserts in the manner clearly shown in Figure 8. Also, the spaded head portions 21' on the studs 17' are not provided with projections on the arcuate surfaces 25' thereof, as in the first described form of this invention. Although in this embodiment of the invention, the openings 23' do not extend completely through the inserts 22', nevertheless, these openings provide for deforming the adjacent inner surfaces of the inserts to the contour of the spaded heads 21' in such a manner as to substantially completely surround the latter without the necessity of preforming the aforesaid inner surfaces of the inserts during the molding operation. With the foregoing exceptions, the embodiment of the invention shown in Figures 5 to 8 inclusive, is the same as the construction described in connection with the first form of this invention.

Thus, from the foregoing, it will be observed that I have provided a connector rendering it possible to embed the head portions of the studs in molded rubber without resorting to the expensive operation of pre-forming the rubber to the contour of the heads on the studs. It will also be noted that my improved connectors, previously described, may be inexpensively manufactured, assembled, and installed.

What I claim as my invention is:

1. In a connector, a housing having an opening in one side thereof, a stud extending into the housing through said opening and having a head located in the housing, and resilient inserts secured within the housing under compression against opposite sides of the head and axially bored to permit the adjacent surfaces to deform and substantially surround the head of the stud.

2. In a connector, a housing having an opening in one side thereof, a stud having an elongated head insertable through the opening into the housing with the major axes of the head extending transversely to the axis of the housing, inserts of molded rubber disposed within the housing on opposite sides of the head and compressed against said sides to conform the inner surfaces of the inserts to the contour of the head, said inserts having axially extending openings therethrough facilitating the flow of the rubber around the head of the stud, and means on the opposite sides of the head cooperating with the inner ends of the openings to locate the head within the housing.

3. In a connector, a housing having an opening in one side thereof, a stud having an enlarged head extending into the housing through the opening and having a shank portion, axially bored resilient inserts located in the housing on opposite sides of the head and compressed against the latter sides of said head to conform the inner ends of the inserts to the contour of the head, and means within the housing cooperating with the shank of the stud to close said opening and thereby prevent the flow of the material from which the inserts are formed out of the housing through said opening.

4. In a connector, a housing, a pair of flexible inserts located within the housing and having the adjacent ends extending in parallel planes normal to the axis of the housing in the free position of the inserts, a stud having a head portion extending into the housing between the adjacent ends of the inserts and having the sides opposite said ends shaped, means for securing the inserts in the housing under compression with the adjacent ends compressed against the shaped sides of the head portion of the stud, and said inserts having axially extending bores therein to provide recesses for receiving the material of the inserts displaced by the head of the stud and thereby facilitate conforming the adjacent ends of the inserts to the shaped sides of the head portion of the stud.

JOHN M. NICKELSEN.